Nov. 8, 1927.
R. A. CURRIE
1,648,446
BAIL FASTENING OR ATTACHING MEANS FOR LANTERNS AND THE LIKE
Filed Dec. 16, 1925
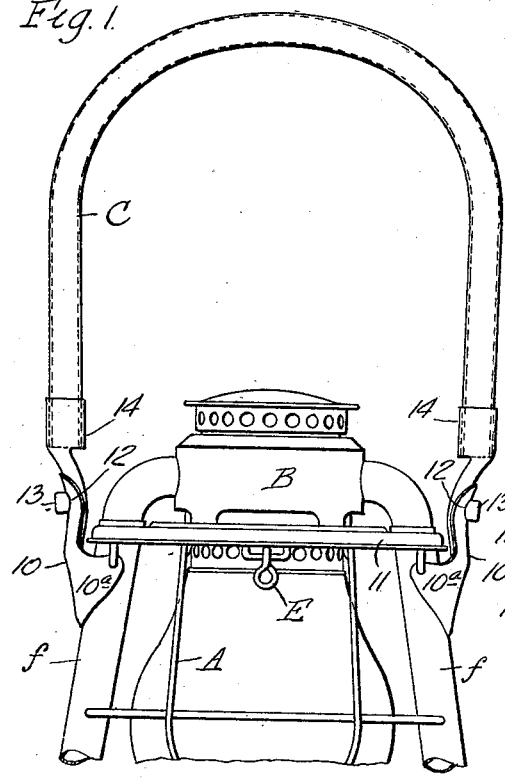
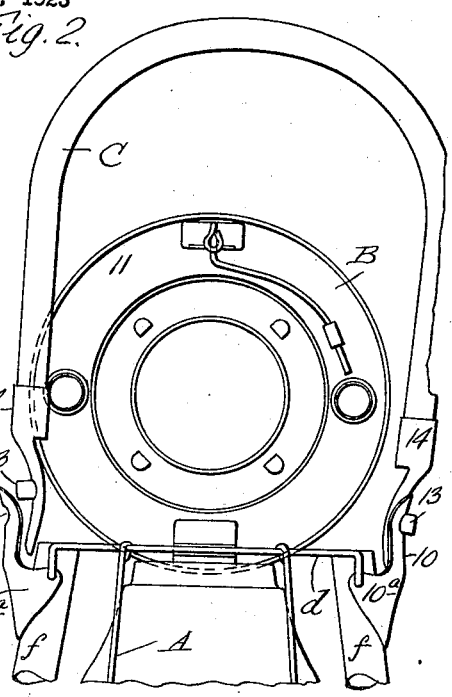
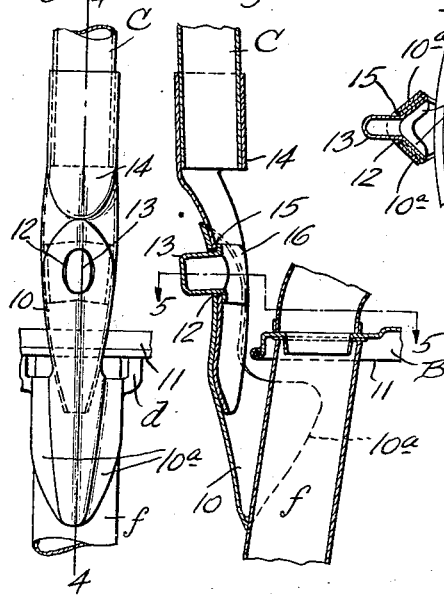
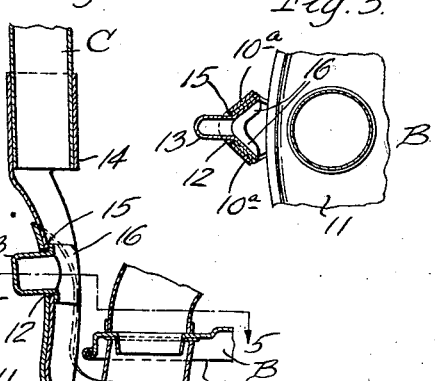
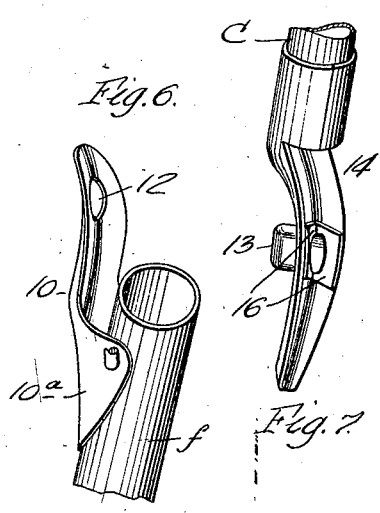
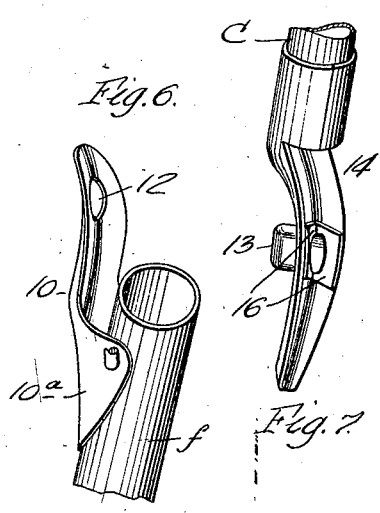
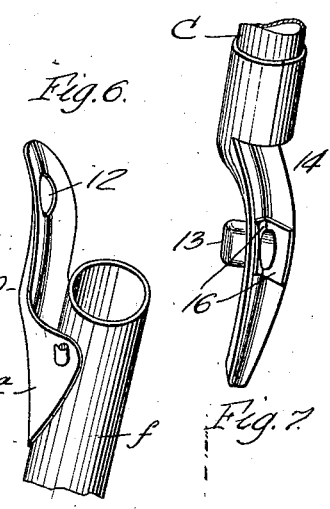
INVENTOR.
Robert A. Currie
By Parker & Rochnow
ATTORNEYS.

Patented Nov. 8, 1927.

1,648,446

UNITED STATES PATENT OFFICE.

ROBERT A. CURRIE, OF SYRACUSE, NEW YORK, ASSIGNOR TO R. E. DIETZ COMPANY, OF NEW YORK, N. Y.

BAIL FASTENING OR ATTACHING MEANS FOR LANTERNS AND THE LIKE.

Application filed December 16, 1925. Serial No. 75,853.

This invention relates to fastenings or attaching means for the bails or handles of lanterns and the like, and more particularly to detachable bail fastenings for signal lanterns of that kind in which means are provided for holding the bail in upright position rigid with the lantern frame, so that the lantern will not swing on the bail and can be manipulated and held in different positions by means of the bail or handle, as may be necessary for signalling purposes.

One of the objects of the invention is to provide desirable means of simple, strong and durable construction, whereby the bail or handle is attached to the body or frame so as to be held rigidly in upright position, and a strong connection provided between the bail and the frame, while, nevertheless, the bail can be readily detached to enable the lantern to be packed in a smaller container, and so that an ordinary wire swinging bail can be substituted in place of the stationary bail, if desired.

Other objects of the invention are to provide attaching means which will securely but detachably fasten the bail rigidly to the frame, and while permitting ready attachment and detachment of the bail to and from the frame, are constructed so that the bail cannot be detached except by first opening the lantern top, thereby preventing either accidental or intentional detachment of the bail in the normal operative condition of the lantern; and also to improve bail attaching means in the other respects hereinafter described and set forth in the claims.

In the accompanying drawings:

Fig. 1 is a front elevation of the upper portion of a lantern showing a detachable bail fastening embodying my invention.

Fig. 2 is a similar view showing the lantern top raised and one side of the bail disconnected from the bail ear.

Fig. 3 is an enlarged side elevation of the bail fastening at one side of the lantern.

Fig. 4 is a fragmentary, longitudinal section of the lantern on line 4—4, Fig. 3.

Fig. 5 is a horizontal section thereof on line 5—5, Fig. 4.

Fig. 6 is a perspective view of one of the bail ears and the upper portion of the frame tube to which it is attached.

Fig. 7 is a perspective view of the lower end of the bail which engages the bail ear shown in Fig. 6.

A represents the upper portion of the stationary frame of a signal lantern of known type. B the hinged top of the lantern and C the lantern bail or handle. Except with respect to the bail attaching or fastening means, the lantern may be of known construction, and as usual in lanterns of this type, the top B is hinged at one side of the lantern to the top ring $d$ of the lantern frame so as to permit the top to swing upwardly and rearwardly from its operative horizontal position shown in Fig. 1 to the position shown in Fig. 2. The top is provided at the front, or side thereof opposite the hinge, with a spring catch E of usual or suitable construction adapted to releasably secure the top in its closed, operative position. The lantern shown is of the tubular type, the air tubes $f$ forming the opposite side members of the frame.

10 represents bail ears which are formed on or rigidly and permanently secured to the upper portion of the lantern frame and project upwardly therefrom at the opposite sides of the circular base flange 11 of the lantern top B when the top is in its closed, operative position. Preferably, the bail ears consist of sheet metal stampings which are of substantially channel or V-shape in cross section and have spaced lower wall portions $10^a$ which embrace and are soldered or otherwise rigidly secured to the frame tubes $f$, and the portions of the bail ears which project upwardly at the sides of the top flange 11 are substantially upright with outwardly flaring upper ends. These upwardly projecting portions of the bail ears are provided with openings 12 for the reception of attaching studs 13 on the lower end portions of the bail C. In the construction shown, the bail is formed by a bent tube which is light but strong and rigid and forms a handle of substantial diameter in cross section, and the studs 13 are provided on sheet metal stampings or end fittings 14 which are secured to the opposite lower ends of the bail tube. As shown, each of these end fittings 14 has an upper, tubular portion which encircles and is soldered or otherwise rigidly secured on the end of the bent bail tube, and the portion of the fitting which depends below the bail tube is of channel or V-shape in cross section corresponding to the cross sectional shape of the bail ear, so that the channel portions of the fitting 14 and the bail ear are adapted to fit snugly one within the other with the stud 13 seated in the stud opening 12 in the bail ear. As shown, the stud 13 consists of a hollow or tubular sheet metal stamping which extends through and is rigidly secured in a hole 15 in the fitting 14, the stud preferably having at its inner end flanges 16 which bear against and are soldered to the inner faces of the V-shaped portion of the fitting 14. The end fittings 14 also preferably curve inwardly from the ends of the bail tube to cooperate with the flaring ends of the bail ears to facilitate the engagement of the bail with the bail ears.

When the bail is in place or attached to the lantern, the end fittings 14 seat or fit snugly in the upright grooves of the V-shaped bail ears 10, with the studs 13 projecting laterally through the openings 12 in the bail ears, and the lower ends of the fittings 14 extend down between the spaced, inwardly extending attaching portions 10ª of the ears. The lower ends of the bail are pressed firmly outwardly against the bail ears by the natural tendency of the lower ends of the bail to spring apart. Thus, the studs and openings 12, the interfitting channel shaped portions of the bail and bail ears and the lower ends of the bail depending between the attaching portions of the bail ears all cooperate to hold the bail rigidly in its intended upright position and prevent any swinging or movement of the bail relative to the frame, so that the bail constitutes a rigid, upright extension or handle of the lantern frame, permitting the lantern to be held in any desired position by means of the bail. The bail can be easily detached from the bail ears by springing in one or both of the lower ends of the bail and lifting the same to disengage the bail studs and ends from the bail ears. This, however, can only be done when the lantern top B is swung up out of its closed, operative position. When the top is in its closed position, in which it is retained by the spring catch E, the circular base flange of the top lies between and close to the end fittings of the bail, as shown in Figs. 1 and 4, the flange of the top being so close to the lower end portions of the bail or end fittings that the latter cannot be sprung inwardly to disengage the studs 13 from the bail ears. When the top is opened, the bail ears can be sprung inwardly and the bail readily disengaged from the bail ears, but the bail cannot be accidentally or intentionally disengaged from the ears except by first opening the top B. Thus, the resilience or tendency of the bail ends to spread apart is not alone relied upon to retain the bail in connection with the ears, and the bail cannot become detached by a weakening of the resilience or by inward pressure of the ends of the bail.

By reason of the described formation of the bail ears and the cooperating end fittings on the bail, the bail is at all times, when in place, firmly and strongly secured to the lantern and held rigidly in upright position, but the construction nevertheless permits very easy and convenient disconnection of the bail from the lantern without the use of tools when the lantern top is opened and swung upwardly.

When the bail C is disconnected from the frame, an ordinary wire bail provided with hooked or bent, lower ends can be readily engaged in the holes 12 of the bail ears in the usual manner of connecting wire bails to objects, and thus a swinging bail for the lantern is readily provided when such may be desired.

I claim as my invention:

1. The combination with a lantern or the like having opposite bail ears provided with upright portions having stud openings therein, and with spaced inwardly projecting attaching walls below said openings, of a bail provided with lateral studs adapted to seat in said stud openings, and lower end portions which bear outwardly against said bail ears and extend downwardly between said attaching walls of the bail ears, whereby said bail is detachably connected to said ears and held against fore and aft movement relative to said ears.

2. The combination with a lantern or the like having opposite bail ears provided with upright portions of channel shaped cross section having stud openings therein, of a bail provided with lateral studs adapted to seat in said stud openings, and channel shaped lower end portions which fit in and bear outwardly against said channel shaped portions of the bail ears below said stud openings, whereby said bail is detachably connected to said bail ears and is held against fore and aft movement relative to said ears.

3. The combination with a lantern or the like having opposite bail ears provided with upright portions of channel shaped cross section having stud openings therein, and with spaced inwardly projecting attaching walls, of a bail provided with lateral studs adapted to seat in said stud openings, and lower end portions which seat in said channel shaped portions of the bail ears and extend downwardly between said attaching walls of the bail ears, whereby said bail is detachably connected to said ears and held against fore and aft movement relative to said ears.

4. The combination with a lantern or the like having opposite bail ears provded with upright portions of channel shaped cross section, having stud openings therein, and with spaced inwardly projecting attaching walls, of a bail provided with lateral studs adapted to seat in said stud openings, and channel shaped lower end portions which fit in said channel shaped portions of the bail ears and extend downwardly between said attaching walls of the bail ears, whereby said bail is detachably connected to said ears and is held against fore and aft movement relative to said ears.

5. The combination with a lantern or the like having a movable top, of bail ears extending from said lantern and disposed at opposite sides of said top and having stud openings, and a bail having studs removably seated in said stud openings, and lower end portions which are disposed adjacent the sides of said top when the top is in operative position, the sides of said top when in operative position being located so as to obstruct the movement of the lower ends of the bail necessary to disengage said studs from said stud openings, thereby preventing the disengagement of the bail from said bail ears.

6. The combination with a lantern or the like having a movable top, of bail ears extending from said lantern at opposite sides of said top and having stud openings, and a bail having laterally projecting studs removably seated in said stud openings and having lower end portions which extend between said ears and the lantern top, the sides of said top when in operative position being located so as to obstruct inward movement of the lower ends of the bail sufficient to disengage said studs from the stud openings.

7. The combination with a lantern or the like having a movable top, of bail ears on said lantern at opposite sides of said top and having upright portions provided with stud openings, and spaced attaching portions below said openings, and a bail having lateral studs removably seated in said stud openings and end portions which depend between said attaching portions of the ears adjacent the sides of said top when the top is in its operative position, the sides of said top when in operative position being located so as to obstruct inward movement of the lower ends of the bail sufficient to disengage said studs from said bail ears.

8. The combination with a lantern or the like having bail ears provided with stud openings, of a bail provided with sheet metal end portions formed with stiffening bends and perforations, and studs secured to said end portions and adapted to enter the stud openings in said ears, said studs having hollow bodies extending through said perforations, and attaching portions soldered to said bent end portions of the bail.

ROBERT A. CURRIE.